United States Patent [19]
Pixley

[11] Patent Number: 4,758,015
[45] Date of Patent: Jul. 19, 1988

[54] LATCH MECHANISM FOR HITCH ASSEMBLY

[75] Inventor: Larry E. Pixley, Troutdale, Oreg.

[73] Assignee: Eagle Manufacturing Company, Portland, Oreg.

[21] Appl. No.: 714,003

[22] Filed: Mar. 20, 1985

[51] Int. Cl.$^4$ .............................................. B60D 1/00
[52] U.S. Cl. ...................................... 280/504; 280/507
[58] Field of Search .............. 280/504, 507, 508, 509, 280/461 A, 477, 515; 172/272, 439

[56] References Cited

U.S. PATENT DOCUMENTS

| | | | |
|---|---|---|---|
| 2,426,532 | 8/1947 | Tierney | 280/504 |
| 2,842,380 | 7/1958 | Weiss | 280/504 |
| 3,475,037 | 10/1969 | Weiss | 280/504 |
| 3,588,146 | 6/1971 | Haddox | 280/504 |

*Primary Examiner*—John J. Love
*Assistant Examiner*—Everett G. Diederiks, Jr.
*Attorney, Agent, or Firm*—Kolisch, Hartwell & Dickinson

[57] ABSTRACT

A novel latch mechanism for a trailer hitch assembly used to interconnect a towing vehicle to a drawn vehicle. The hitch assembly includes a frame, mounted on the towing vehicle, having an upwardly extending pintle and a cavity disposed adjacent the pintle for receiving the coupling element of the drawn vehicle; a spring-biased, pivotally-mounted latch extending over the frame cavity, having a notch and a ledge disposed adjacent its forward end; and a spring-biased, pivotally-mounted pawl, generally overlying the latch, having a cam disposed adjacent its forward end and its rear end adjacent and in seated relation in the notch of the latch. In the apparatus of the invention the latch is held securely in place by the cooperating action of three different safety features: the pawl spring urges the rear end of the pawl downwardly into seated relationship in the latch notch; the pawl cam and an opposing cam-engaging surface on the latch disposed adjacent the cam prevent lateral displacement of the latch; and the latch ledge and an opposed shoulder on the frame prevent pivotal movement of the latch, without axial displacement.

6 Claims, 2 Drawing Sheets

LATCH MECHANISM FOR HITCH ASSEMBLY

BACKGROUND AND SUMMARY OF THE INVENTION

The present invention relates to trailer hitches and, more particularly, to a novel triple fail-safe latch mechanism for a hitch assembly used to interconnect a towing vehicle to a drawn vehicle.

Conventionally a towing vehicle is interconnected to a drawn vehicle by mounting on the towing vehicle a hitch assembly. A coupling element, such as an eye, is provided on the drawbar of the drawn vehicle. The hitch assembly generally comprises a body or frame having a forward portion which terminates in a flange area designed for mounting on the towing vehicle, a base portion from which projects a pair of spaced webs, and a rear portion which flows smoothly from the base portion into a solid hook or pintle. Disposed adjacent the pintle is a cavity. Extending over the frame cavity and interposed the webs, is a pivotally mounted latch which has a notch intermediate its ends. A pawl is also interposed the webs and partially overlies the latch, with one end of the pawl in seated relation in the notch of the latch. Typically a spring is used to bias the the pawl downwardly into seated relation in the notch of the latch. The other end of the pawl is pivotally mounted on a pin having a handle used to laterally displace the pawl from its position in the notch.

The disadvantage with the conventional design is that, if the pawl spring is damaged or becomes defective, the pawl would rotate freely about its pivot axis, and the latch likewise would be "free-floating", i.e., enjoying unrestricted vertical movement. In such a condition, the coupling element on the drawn vehicle may easily disengage from the pintle. It can be appreciated that accidental disengagement of the coupling element from the pintle can result in serious property damage as well as personal injury.

Accordingly, it is a general object of the present invention to provide a novel latch mechanism for a trailer hitch which provides multiple safety features to prevent accidental disengagement of the latch.

Another object of the present invention is to provide a latch mechanism for a hitch assembly which will not accidentally disengage if the pawl becomes damaged or defective.

A further object of the invention is to provide a latch mechanism for a hitch assembly which provides a means to prevent lateral displacement of the latch when the rear end of the pawl is moved out of seated relationship with the notch.

Yet another object of the invention is to provide a means for preventing pivotal movement of the latch without lateral displacement of the latch, in a condition where the pawl is out of seated relationship with the notch.

A preferred embodiment of the proposed apparatus of the invention includes a hitch frame mounted on the towing vehicle with an upwardly extending pintle and a cavity disposed adjacent the pintle for receiving the coupling element mounted on the drawn vehicle. Extending over the frame cavity is a latch which has a forward end and a rear end with the rear end adjacent the pintle. The latch includes mounting means pivotally mounting the forward end of the latch accommodating upward movement of the rear end of the latch with pivotal movement of the latch. The mounting means also permits lateral displacement of the latch. A notch is disposed intermediate the ends of the latch. A spring-biased pawl generally overlies the latch and has a forward end pivotally mounted on the frame and a rear end adjacent and in seated relation in the notch of the latch. The pawl further includes a cam disposed adjacent its forward end. A recess or cam-engaging surface is disposed on the latch opposite the cam, to prevent lateral displacement of the latch with the rear end of the pawl moved out of seated relationship with the notch. The latch is fixedly secured to a pin, which provides the pivot axis for the latch. The pin includes a handle disposed exteriorly of the hitch assembly which is used to laterally displace the latch. The latch further includes a ledge disposed adjacent its forward end which seats within a shoulder of the frame opposing the ledge to prevent pivotal movement of the latch.

In operation, the pawl is manually lifted upwardly moving the rear end of the pawl out of seated engagement with the notch and the cam out of engagement with the cam surface. The handle on the latch pin is then shifted axially to move the latch's ledge away from the shoulder and free the latch for pivotal movement. The latch is then swung open, and held in an upright position. So positioned, the coupling element on the drawn vehicle may be inserted into the frame cavity and around the pintle. Once the coupling element is inserted, the handle of the latch pin may be released thereby allowing the latch to close over the cavity to effect a secure interconnection of the drawn vehicle to the towing vehicle.

With the construction described, it can be seen that the drawn vehicle is securely interconnected to the towing vehicle and that the latch is held in place by the cooperating action of three different safety features: the pawl spring urging the rear end of the pawl downwardly into seated relationship in the latch notch; the cam and its opposing cam-engaging surface preventing lateral displacement of the latch; and the latch ledge and its opposed frame shoulder preventing pivotal movement of the latch, without axial displacement.

These and other objects and advantages of the present invention will become more clearly understood from a consideration of the drawings and the following detailed description of a preferred embodiment.

DETAILED DESCRIPTION OF A PREFERRED EMBODIMENT OF THE INVENTION

As generally described above, it is an object of the present invention to provide a hitch assembly for interconnecting a towing vehicle to a drawn vehicle.

Figure 1:
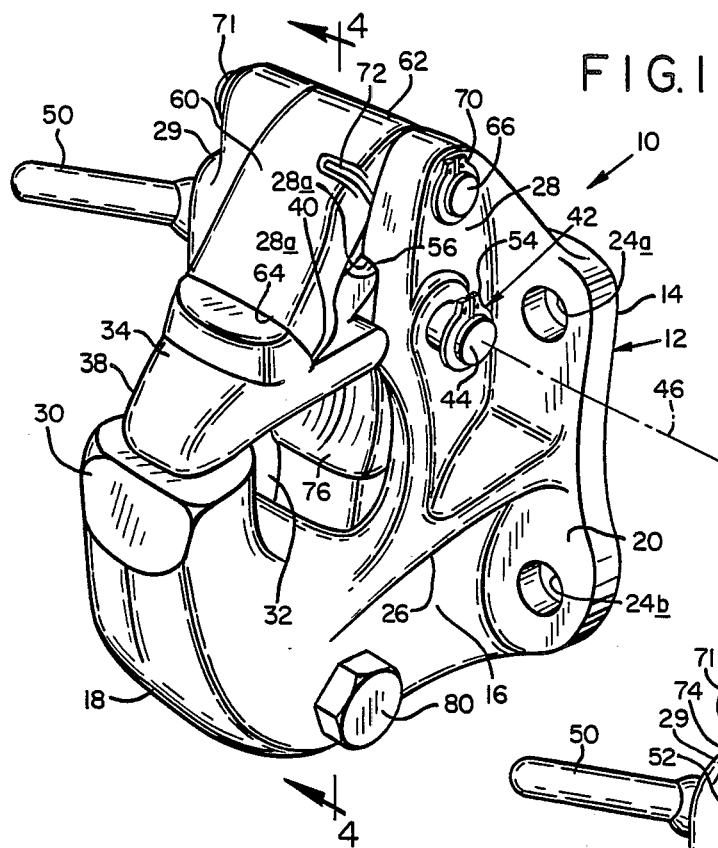
FIG. 1 is a side perspective view of a hitch assembly according to the present invention, illustrating a condition wherein the latch is in a locked position and the pawl is in seated relation in the notch of the latch.

Referring now to the drawings and, more particularly to FIG. 1, there is shown generally at 10 a hitch assembly according to the present invention. Hitch assembly 10 includes a hitch frame or body, shown generally at 12, which is typically constructed of manganese alloys. Hitch frame 12 includes a forward expanse 14, a base portion 16 and a second expanse 18.

First expanse 14 comprises a pair of flanges forming opposite sides of the frame, such as flange 20, in which are provided a plurality of apertures, such as indicated at 24a, 24b. Conventional bolts (not shown) are inserted through the apertures provided in the flanges and then further inserted through suitably alignable apertures provided in the mounting area in the rear of the towing vehicle. The bolts are then secured in place, thus mounting the hitch assembly on the towing vehicle.

Base 16 includes a pair of ribs adjacent opposite sides of the frame, such as rib 26, which project outwardly from base 16. Also projecting from base 16 is a pair of reinforced, spaced webs 28, 29. A shoulder 28a is disposed interiorly on web 28.

Second expanse 18 is joined to and flows smoothly from base 16 into a solid upwardly extending hook or pintle 30. A cavity or "crotch" area 32 is disposed adjacent pintle 30.

Figure 2:
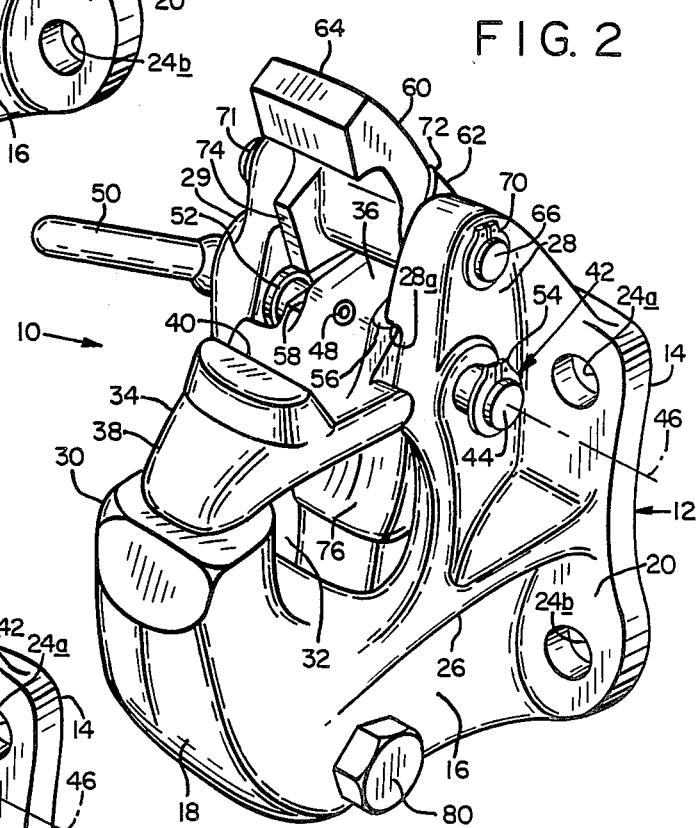
FIG. 2 is a side perspective view similar to FIG. 1, illustrating a relative condition wherein the latch remains in a locked position even though the pawl is rotated out of seated relationship with the notch.

Focusing attention on FIGS. 1 and 2, extending over frame cavity 32 is a latch 34 having a forward end 36 and a rear end 38 which is adjacent pintle 30. A notch 40 is disposed intermediate ends 36 and 38. Mounting means, shown generally at 42, pivotally mounts forward end 36 of latch 34, accommodating upward movement of rear end 38 with pivotal movement of the latch. Mounting means 42 also permits lateral displacement of latch 34.

Mounting means 42 includes a pin 44, which extends through a pair of apertures (not shown) in webs 28, 29. Pin 44 provides a pivot axis 46 for latch 34 which is fixedly secured to pin 44 by a set screw 48, shown in FIG. 2. Pin 44 further includes a handle 50 disposed exteriorly of hitch assembly 10 usable in laterally displacing latch 34.

Pin 44 is shiftable axially in a direction parallel to pivot axis 46 and handle 50 is usable in shifting pin 44 along this axis. Latch mounting means 42 further includes a spring or biasing means 52, best shown in FIG. 2, urging pin 44 axially in a direction parallel to pivot axis 46. Mounted on the end of pin 44 opposite handle 50 is a grip ring 54 used to hold securely pin 44 in position.

Figure 5:
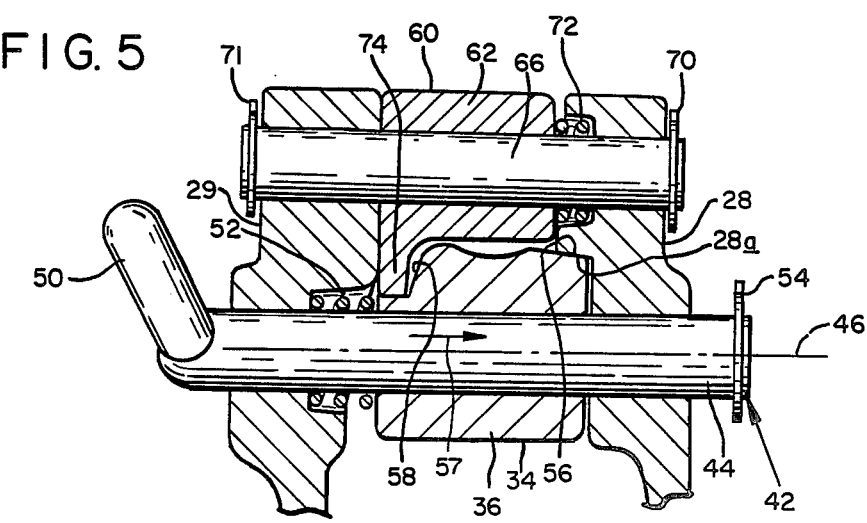
FIG. 5 is an enlarged cross-sectional view taken generally along line 5—5 in FIG. 4.

Turning now to FIGS. 2 and 5, latch 34 further includes a ledge 56 disposed adjacent forward end 36. Frame shoulder 28a in web 28 is opposite ledge 56. Biasing means 52 urges pin 44 axially in one direction (or to the right as indicated by arrow 57 in FIG. 5), parallel to pivot axis 46, to position ledge 56 in a position underlying shoulder 28a of frame 12. This prevents pivotal movement of latch 44 about its pivot axis 46. In order to free the latch for pivotal movement, pin 44 must be shifted axially to move ledge 56 away from under frame shoulder 28a.

Latch 34 also includes a recess or cam-engaging surface 58.

Figure 4:
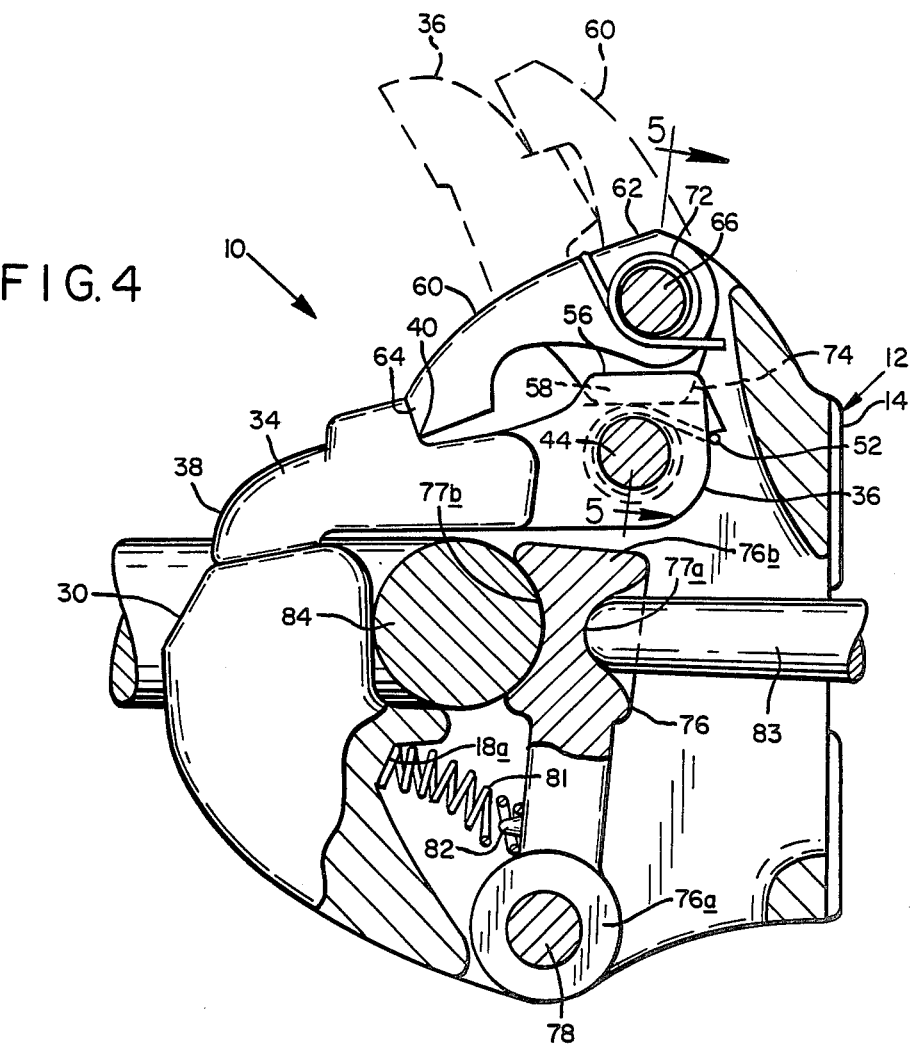
FIG. 4 is a partial cross-sectional view taken generally along line 4—4 in FIG. 1.

As best shown in FIGS. 1, 4 and 5, a pawl 60 is interposed between webs 28, 29 and generally overlies latch 34. Pawl 60 has a forward end 62 and a rear end 64. Forward end 62 is pivotally mounted on pawl pin 66 which extends through accommodating bores in webs 28, 29. Retaining rings 70, 71 are mounted on the opposed ends of pin 66 to hold the pin in position. A torsion spring 72 urges rear end 64 of the pawl into seated relationship in notch 40 of latch 34.

Pawl 60 further includes a protruding expanse or cam 74 disposed adjacent its forward end 62. Cam-engaging surface 58 on latch 34 is disposed opposite cam 74 with the latch lowered. In this postion, it prevents lateral displacement of latch 34.

Focusing attention now on FIG. 4, a shoe, shown generally at 76, is disposed within frame cavity 32. Shoe 76 has one end 76a pivotally mounted in frame base 16 on shank 78 of a bolt 80. The other end 76b of the shoe is enlarged and has two opposed concave surfaces 77a, 77b. A coil spring 81, disposed between shoe 76 and second expanse 18, urges the shoe in a direction away from pintle 30. One end of spring 81 rests on a protrusion 82 extending from shoe 76 and the other end of spring 81 rests in a recess 18a in frame second expanse 18. With two vehicles coupled together, eye or coupling element 84 is seated above the pintle. The rod 83 of an air cylinder is extended yieldably to hold shoe 76 against element 84.

Turning now to a description of an actual interconnecting operation utilizing hitch 10, attention is initially focused on FIG. 1 showing pawl 60 in seated engagement within the notch of latch 34, with the latch in a locked position adjacent pintle 30.

Figure 3:
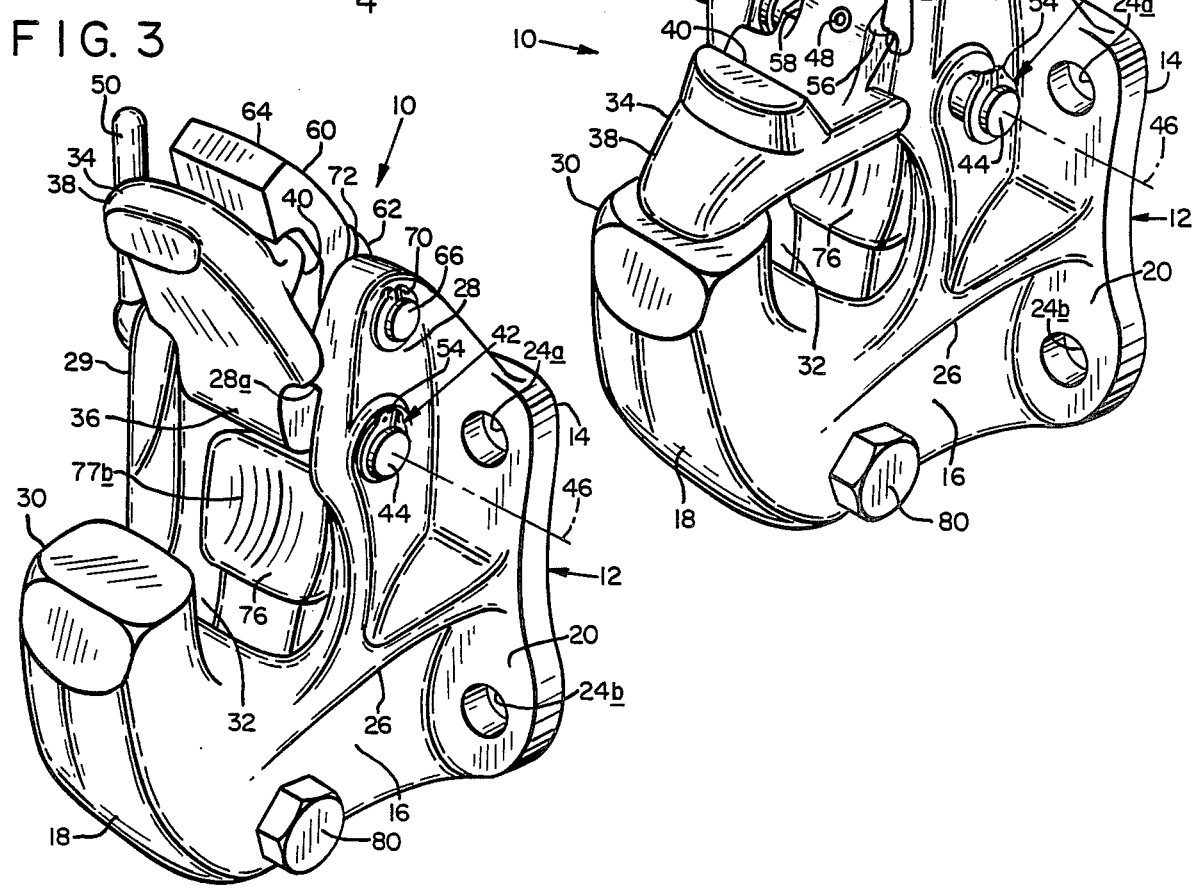
FIG. 3 is a side perspective view similar to FIGS. 1 and 2, illustrating a relative position wherein the latch is axially displaced with the latch's ledge away from the frame shoulder, and pivoted upwardly out of a locked condition.

Focusing now on FIG. 2, pawl 60 may be manually lifted upwardly out of seated engagement with notch 40. Just freeing the pawl from the notch does not permit upward pivotal movement of the latch, however. The pawl must be pivoted upwardly approximately 70°, to move pawl cam 74 out of engagement with cam-engaging surface 58, before the latch is free to move. Once cam 74 is moved out of the way of surface 58, latch pin 44 may be shifted axially in a direction parallel to pivot axis 46 to move the latch's ledge 56 away from shoulder 28a, thereby freeing latch 34 for upward pivotal movement. Handle 50 may then be rotated upwardly swinging latch 34 to a raised position (see FIG. 3).

So positioned, coupling element 84, which is mounted on the drawbar of the drawn vehicle, may be inserted over the pintle. With coupling element 84 properly positioned, handle 50 may then be released. With release of the handle, and lowering of the latch, spring 52 urges pin 44 axially to shift the latch so that ledge 56 moves under shoulder 28a. This movement is further accompanied with downward pivotal movement of the pawl with its rear end ultimately seating in notch 40. This returns the various parts to the position shown in FIG. 1.

The driver of the towing vehicle then actuates the air cylinder which includes rod 83, whereby shoe 76 moves snugly against coupling element 84.

It has been found through repeated testing that hitch assembly 10 securely and snugly holds coupling element 84 of the drawn vehicle to the towing vehicle, and does not accidentally disengage. Furthermore, vertical-pull tension-load tests have demonstrated that the hitch assembly of the present invention is considerably stronger than conventional hitches.

From the above disclosure, it can be appreciated that hitch assembly 10 provides a simple and rapid method for interconnecting a drawn vehicle to a towing vehicle. Further, because of the unique construction of the hitch assembly, the latch is securely held in place by three fail-safe systems. First, the rear end of the pawl is biased downwardly against and into seated relationship with the notch in the latch. Second, even if the biasing means of the pawl is damaged or defective, accidental axial displacement of the latch is prevented by the cooperating action of the pawl cam and the cam-engaging surface on the latch which prevents lateral displacement of the latch. Third, pivotal movement of the latch is prevented by the cooperating action of the latch biasing means which urges the latch pin axially in one direction to position the latch ledge into seated relationship with its opposed frame shoulder.

While a particular embodiment of the invention has been described it should be obvious that variations and modifications are possible without departing from the spirit of the invention.

It is claimed and desired to secure by Letters Patent:

1. A hitch assemebly for use in interconnecting a towing vehicle to a coupling element of a drawn vehicle comprising:

a hitch frame adapted to be mounted on the towing vehicle including an upwardly extending pintle and a cavity disposed adjacent and forwardly of said pintle for receiving the coupling element of the drawn vehicle, a latch having a forward and rear end occupying a lowered position closing off the top of said cavity with the rear end thereof overlying and adjacent said pintle, a substantially horizontal pin mounting the forward end of the latch on said hitch frame with the latch being pivotable about the axis of the pin and laterally displaceable in a direction extending along the axis of the pin, a pawl occupying a lowered position generally overlying said latch having a rear end lying adjacent said latch and a pivotally mounted forward end providing for upward pivotal movement of the rear end of the pawl, first locking means comprising a notch on said latch receiving the rear end of the pawl preventing upward pivotal movement of the latch and released with upward pivotal movement of the rear end of the pawl, second locking means interposed between the latch and said hinge frame preventing upward pivotal movement of the latch and released with lateral displacement of the latch, and a third locking means interposed between the pawl and said latch preventing lateral displacement of the latch and released with upward pivotal movement of the rear end of said pawl.

2. The hitch assembly of claim 1, wherein said second locking means comprises a ledge on said latch and a shoulder on said frame opposite the ledge preventing pivotal movement of the latch without lateral displacement of the latch.

3. The hitch assembly of claim 2, wherein the latch is fixedly secured to the pin and the pin is rotatably mounted on and axially displaceable on said frame.

4. The hitch assembly of claim 3, wherein the pin includes a handle disposed exteriorly of the hitch assembly usable in laterally displacing and rotating the pin.

5. The hitch assembly of claim 3, wherein the mounting means further includes biasing means urging the pin axially in one direction to position the ledge of said latch opposite shoulder of said frame.

6. The hitch assembly of claim 1, wherein said third locking means comprises a cam on said pawl adjacent its forward end, and a cam-engaging surface on said latch disposed opposite said cam with the pawl in its lowered position.

* * * * *